(12) United States Patent
Chen et al.

(10) Patent No.: US 11,889,526 B2
(45) Date of Patent: *Jan. 30, 2024

(54) DATA TRANSMISSION METHOD, TERMINAL DEVICE AND NETWORK DEVICE

(71) Applicant: GUANGDONG OPPO MOBILE TELECOMMUNICATIONS CORP., LTD., Guangdong (CN)

(72) Inventors: Wenhong Chen, Dongguan (CN); Zhihua Shi, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 128 days.

This patent is subject to a terminal disclaimer.

(21) Appl. No.: 17/580,807

(22) Filed: Jan. 21, 2022

(65) Prior Publication Data

US 2022/0150948 A1    May 12, 2022

Related U.S. Application Data

(63) Continuation of application No. 17/313,817, filed on May 6, 2021, now Pat. No. 11,272,531, and a
(Continued)

(51) Int. Cl.
*H04W 72/23* (2023.01)
*H04B 1/713* (2011.01)
(Continued)

(52) U.S. Cl.
CPC ............ *H04W 72/23* (2023.01); *H04B 1/713* (2013.01); *H04L 5/0048* (2013.01); *H04W 52/146* (2013.01)

(58) Field of Classification Search
CPC .. H04W 52/146; H04W 72/23; H04L 5/0048; H04B 1/713
(Continued)

(56) References Cited

U.S. PATENT DOCUMENTS

| | | | |
|---|---|---|---|
| 11,272,531 B2 * | 3/2022 | Chen | H04B 1/713 |
| 2015/0098421 A1 | 4/2015 | Barbieri et al. | |

(Continued)

FOREIGN PATENT DOCUMENTS

| | | | |
|---|---|---|---|
| CN | 104955155 A | 9/2015 | |
| CN | 105594280 A | 5/2016 | |

(Continued)

OTHER PUBLICATIONS

Vivo, "Discussion on Enhancements on Multi-TRP/Panel Transmission", 3GPP TSG RAN WG1 #95 R1-1812323, Spokane, US, Nov. 12-Nov. 16, 2018. 7 pages.
(Continued)

*Primary Examiner* — Peter G Solinsky
(74) *Attorney, Agent, or Firm* — PERKINS COIE LLP

(57) ABSTRACT

Disclosed are a method for data transmission, a terminal device, a network device, a chip, a computer-readable storage medium, a computer program product and a computer program. The method comprises: determining, according to data channel configuration information corresponding to a control resource set (CORESET) or a search space, a transmission parameter of a data channel; and transmitting or receiving, based on the transmission parameter, the data channel, wherein the CORESET or the search space is a CORESET or a search space where downlink control information (DCI) used for scheduling the data channel is detected, or, the CORESET or the search space is a CORE-
(Continued)

---

201 — A transmission parameter of a data channel is determined based on data channel configuration information corresponding to a CORESET or a search space 202 — The data channel is transmitted or received based on the transmission parameter SET or a search space that uses the same quasi-co-location (QCL) type D assumption as a control channel for scheduling the data channel.

20 Claims, 2 Drawing Sheets

Related U.S. Application Data continuation of application No. PCT/CN2018/119632, filed on Dec. 6, 2018.

(51) Int. Cl.
*H04L 5/00* (2006.01)
*H04W 52/14* (2009.01)

(58) Field of Classification Search
USPC ........................................................ 370/329
See application file for complete search history.

(56) References Cited

U.S. PATENT DOCUMENTS

| | | |
|---|---|---|
| 2018/0019844 A1 | 1/2018 | Nogami et al. |
| 2018/0198650 A1 | 7/2018 | Nogami et al. |
| 2019/0281587 A1 | 9/2019 | Zhang |
| 2019/0379506 A1 | 12/2019 | Cheng |
| 2020/0007208 A1 | 1/2020 | Zhou et al. |
| 2020/0119875 A1 | 4/2020 | Pravin et al. |
| 2020/0145860 A1 | 5/2020 | Koskela et al. |
| 2020/0403763 A1 | 12/2020 | Takeda et al. |
| 2021/0022152 A1 | 1/2021 | Yang |
| 2021/0127377 A1 | 4/2021 | Lee et al. |
| 2021/0168846 A1 | 6/2021 | Li et al. |

FOREIGN PATENT DOCUMENTS

| | | |
|---|---|---|
| CN | 107666340 A | 2/2018 |
| CN | 108289016 A | 7/2018 |
| WO | 2018172994 A1 | 9/2018 |

OTHER PUBLICATIONS

Huawei, HiSilicon, "Summary of AI: 7.2.8.2 Enhancements on Multi-TRP/Panel Transmission", 3GPP TSG RAN WG1 Meeting #95 R1-1814002, Spokane, USA, Nov. 12-16, 2018. 32 pages.
First Office Action of the Japanese application No. 2021-532015, dated Nov. 8, 2022. 7 pages with English translation.
Second Office Action of the Chinese application No. 202110540796. X, dated Nov. 10, 2022. 16 pages with English translation.
Second Office Action of the European application No. 18942072.2, dated Dec. 20, 2022. 5 pages.
Office Action of the Indian application No. 202127029438, dated Dec. 15, 2022. 6 pages with English translation.
Nokia, "Draft CR on cross-carrier scheduling in FR2", 3GPP TSG-RAN1 Meeting #95 R1-1814371, Nov. 12-16, 2018. 3 pages.
Notice of Rejection of the Japanese application No. 2021-532015, dated Mar. 17, 2023. 8 pages with English translation.
ZTE; "Enhancements on multi-TRP/Panel transmission", 3GPP TSG RAN WG1 Meeting #95 R1-1812256, Nov. 16, 2018 (Nov. 16, 2018), section 2.1.2.
OPPO; "Enhancements on multi-TRP and multi-panel transmission", 3GPP TSG-RAN WG1 Meeting #95 R1-18102807, Nov. 16, 2018 (Nov. 16, 2018), entire document.
CHTTL; "Discussion on Multi-TRP transmission", 3GPP TSG RAN WG1 Meeting #95 R1-1813278, Nov. 16, 2018 (Nov. 16, 2018), entire document.
3rd Generation Partnership Project, "NR; Physical layer procedures for data", 3GPP TS 38.214 V15.3.0, Sep. 30, 2018 (Sep. 30, 2018), entire document.
Huawei, HiSilicon; "Enhancements on Multi-TRP/panel transmission", 3GPP TSG RAN WG1 Meeting #96, R1-1901567, Athens, Greece, Feb. 25-Mar. 1, 2019.
OPPO; "Enhancements on multi-TRP and multi-panel transmission", 3GPP TSG RAN WG1 Meeting #96, R1-1902701. Athens, Greece, Feb. 25-Mar. 1, 2019.
International Search Report in the international application No. PCT/CN2018/119632, dated Sep. 10, 2019.
Written Opinion of the International Search Authority in the international application No. PCT/CN2018/119632, dated Sep. 10, 2019.
First Office Action of the U.S. Appl. No. 17/313,817, dated Jul. 2, 2021.
Notice of Allowance of the U.S. Appl. No. 17/313,817, dated Oct. 26, 2021.
3GPP, "3rd Generation Partnership Project; Technical Specification Group Radio Access Network; NR; Physical layer procedures for data (Release 15)", 3GPP TS 38.214 v15.4.0 (Dec. 2018).
NTT Docomo, Inc. "Offline summary for PDCCH structure and search space", 3GPP TSG RAN WG1 Meeting #94bis R1-1811820, Chengdu, China, Oct. 8-12, 2018.
NTT Docomo, Inc. "Discussion on Coreseto", 3GPP TSG RAN WG1 Meeting #95 R1-1813934, Spokane, USA, Nov. 12-16, 2018.
Ericsson, "Feature lead summary beam management", 3GPP TSG-RAN WG1 Meeting #94 Tdoc R1-1809759, Gothenburg, Aug. 20-24, 2018.
Supplementary European Search Report in the European application No. 18942072.2, dated Nov. 2, 2021.
First Office Action of the European application No. 18942072.2, dated Jul. 6, 2022. 8 pages.
First Office Action of the Chinese application No. 202110540796.X, dated Aug. 22, 2022. 27 pages with English translation.

\* cited by examiner

Second communication unit 52
FIG. 5
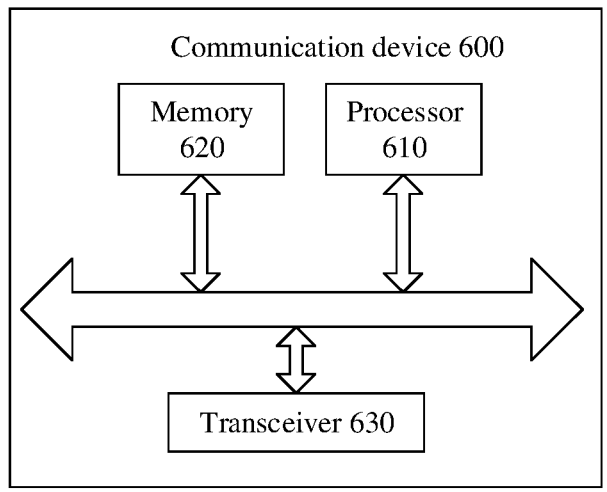
FIG. 6
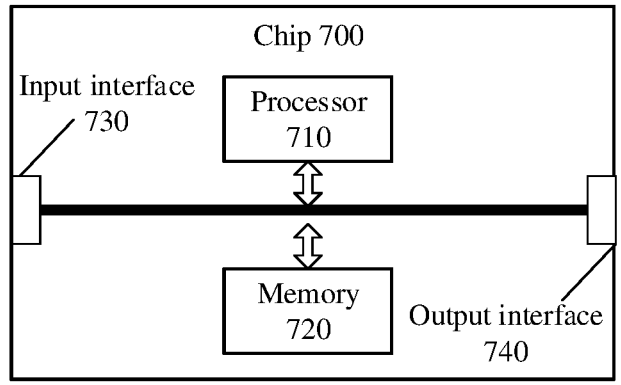
FIG. 7
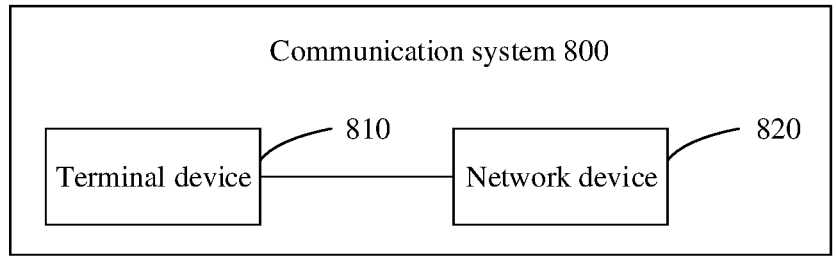
FIG. 8

DATA TRANSMISSION METHOD, TERMINAL DEVICE AND NETWORK DEVICE

CROSS-REFERENCE

This is a continuation of U.S. patent application Ser. No. 17/313,817 filed May 6, 2021, which is a continuation application of International Patent Application No. PCT/CN2018/119632, filed on Dec. 6, 2018, the entire contents of which are incorporated herein by reference in its entirety.

TECHNICAL FIELD

The present disclosure relates to the technical field of information processing, and more particularly, to a method for data transmission, a terminal device, a network device, a computer storage medium, a chip, a computer readable storage medium, a computer program product and a computer program.

BACKGROUND

In New Radio (NR), multiple transmission/reception points (TRPs)/antenna panels may independently schedule uplink or downlink data transmission for a terminal. The data transmission between different TRPs/panels and the terminals is generally scheduled by an independently configured control resource set (CORESET) or a physical downlink control channel (PDCCH) in a search space, that is, different CORESETs or search spaces correspond to different TRPs/panels. In the related art, a terminal on each bandwidth part (BWP) has only one data channel configuration information (PDSCH-config or PUSCH-config), data channels scheduled by different TRPs/panels can only use the same transmission parameter, which greatly limits the flexibility of scheduling, and furthermore, serious interference may be generated between the data channels scheduled by different TRPs/panels, thereby affecting the performance of data transmission.

SUMMARY

To solve the above technical problems, embodiments of the present disclosure provide a method for data transmission, a terminal device, a network device, a computer storage medium, a chip, a computer readable storage medium, a computer program product and a computer program.

According to a first aspect, the embodiments of the present disclosure provide a method for data transmission, which is applied to a terminal device and includes the following operations.

A transmission parameter of a data channel is determined based on data channel configuration information corresponding to a control resource set (CORESET) or a search space.

The data channel is transmitted or received based on the transmission parameter.

The CORESET or the search space is a CORESET or a search space where downlink control information (DCI) for scheduling the data channel is detected; or, the CORESET or the search space is a CORESET or a search space using same quasi-co-location (QCL) type D assumption as a control channel for scheduling the data channel.

According to a second aspect, the embodiments of the present disclosure provide a terminal device, which includes a first processing unit and a first communication unit.

The first processing unit is configured to determine a transmission parameter of a data channel based on data channel configuration information corresponding to a CORESET or a search space.

The first communication unit is configured to transmit or receive the data channel based on the transmission parameter.

The CORESET or the search space is a CORESET or a search space where DCI for scheduling the data channel is detected; or, the CORESET or the search space is a CORESET or a search space using same QCL type D assumption as a control channel for scheduling the data channel.

According to a third aspect, the embodiments of the present disclosure provide a method for data transmission, which is applied to a network device and includes the following operations.

Data channel configuration information corresponding to a CORESET or a search space is transmitted to a terminal device, and a data channel is transmitted or received.

The CORESET or the search space is a CORESET or a search space where DCI for scheduling the data channel is detected; or, the CORESET or the search space is a CORESET or a search space using same QCL type D assumption as a control channel for scheduling the data channel.

According to a fourth aspect, the embodiments of the present disclosure provide a network device, which includes a second communication unit.

The second communication unit is configured to transmit data channel configuration information corresponding to a CORESET or a search space to a terminal device, and transmit or receive a data channel.

The CORESET or the search space is a CORESET or a search space where DCI for scheduling the data channel is detected; or, the CORESET or the search space is a CORESET or a search space using same QCL type D assumption as a control channel for scheduling the data channel.

According to a fifth aspect, a terminal device is provided, which includes a processor and a memory. The memory is configured to store a computer program, and the processor is configured to call and run the computer program stored in the memory to execute the method in the first aspect or any possible implementation of the first aspect.

According to a sixth aspect, a network device is provided, which includes a processor and a memory. The memory is configured to store a computer program, and the processor is configured to call and run the computer program stored in the memory to execute the method in the third aspect or any possible implementation of the third aspect.

According to a seventh aspect, a chip is provided. The chip is configured to implement the method in any one of the first or third aspect or any possible implementation of the first or third aspect.

Specifically, the chip includes a processor. The processor is configured to call call a computer program from a memory and run the computer program, to cause a device mounted with the chip to execute the method in any one of the first or third aspect or any possible implementation of the first or third aspect.

According to an eighth aspect, a computer readable storage medium for storing a computer program is provided. The computer program causes a computer to execute the method in any one of the first or third aspect or any possible implementation of the first or third aspect.

According to a ninth aspect, a computer program product is provided, which includes a computer program instruction. The computer program instruction causes a computer to execute the method in any one of the first or third aspect or any possible implementation of the first or third aspect.

According to a tenth aspect, a computer program is provided. The computer program, when running on a computer, causes a computer to execute the method in any one of the first or third aspect or any possible implementation of the first or third aspect.

By using the above solutions, the transmission parameter of the data channel may be determined based on data channel configuration information corresponding to the CORESET or the search space and then the data channel is transmitted or received based on the transmission parameter. In this way, since data channel configuration information corresponding to different CORESETs or search spaces may be different, different data channels may have corresponding different data channel configuration information, thereby ensuring that multiple data channels may use independent data channel configuration information and improving the flexibility of scheduling. Furthermore, based on the methods of the present disclosure, different data channel configuration information may be used for data channels scheduled by different TRPs or panels, so that interference between different data channels is reduced, thereby ensuring performance of data transmission.

BRIEF DESCRIPTION OF THE DRAWINGS

FIG. 5 is a schematic structural diagram of a network device according to an embodiment of the present disclosure.

FIG. 6 is a schematic structural diagram of a communication device according to an embodiment of the present disclosure.

FIG. 7 is a schematic block diagram of a chip according to an embodiment of the present disclosure.

FIG. 8 is a second schematic diagram of a communication system architecture according to an embodiment of the present disclosure.

DETAILED DESCRIPTION

In order to understand the features and technical contents of the embodiments of the present disclosure in more detail, implementation of the embodiments of the present disclosure will be described in detail with reference to the accompanying drawings. The accompanying drawings are provided for purposes of illustration only and are not intended to limit the embodiments of the present disclosure.

The technical solutions in the embodiments of the disclosure will be described below in combination with the drawings in the embodiments of the disclosure. It is apparent that the described embodiments are not all embodiments but part of embodiments of the disclosure. All other embodiments obtained by those of ordinary skill in the art based on the embodiments in the disclosure without creative work shall fall within the scope of protection of the disclosure.

The technical solutions of the embodiments of the present disclosure may be applied to various communication systems, such as a Global System of Mobile communication (GSM) system, a Code Division Multiple Access (CDMA) system, a Wideband Code Division Multiple Access (WCDMA) system, a General Packet Radio Service (GPRS), a Long Term Evolution (LTE) system, an LTE Frequency Division Duplex (FDD) system, an LTE Time Division Duplex (TDD), a Universal Mobile Telecommunication System (UMTS), a Worldwide Interoperability for Microwave Access (WiMAX) communication system, a 5G system and the like.

Figure 1:
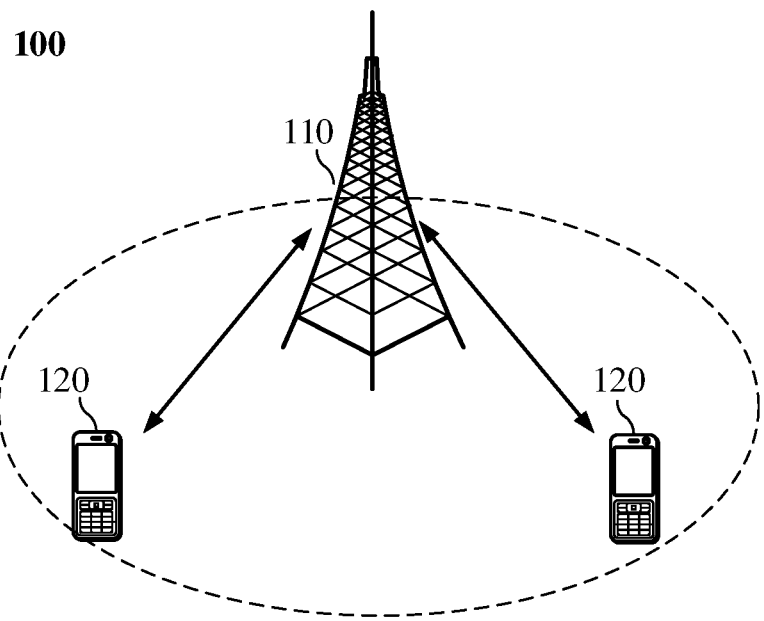
FIG. 1 is a first schematic diagram of a communication system architecture according to an embodiment of the present disclosure.

Exemplarily, a communication system 100 to which the embodiments of the present disclosure are applied is illustrated in FIG. 1. The communication system 100 may include a network device 110. The network device 110 may be a device communicating with a terminal device 120 (also referred to as a communication terminal, a terminal). The network device 110 may provide communication coverage for a specific geographic area and may communicate with a terminal device within the coverage area. In at least one example, the network device 100 may be a Base Transceiver Station (BTS) in the GSM or the CDMA system, may also be a NodeB (NB) in the WCDMA system, and may further be an Evolutional Node B (eNB or eNodeB) in the LTE system or a wireless controller in a Cloud Radio Access Network (CRAN), or the network device may be a mobile switching center, a relay station, an access point, a vehicle-mounted device, a wearable device, a hub, a switch, a bridge, a router, a network-side device in a 5G network, a network device in a future evolved Public Land Mobile Network (PLMN) or the like.

The communication system 100 also includes at least one terminal device 120 located within the coverage of the network device 110. The "terminal device" used herein includes, but is not limited to, connection via wired lines, such as connection via Public Switched Telephone Networks (PSTN), Digital Subscriber Line (DSL), digital cables, direct cables; and/or another data connection/network; and/or via a wireless interface, such as for a cellular network, a Wireless Local Area Network (WLAN), a digital television network such as DVB-H network, a satellite network, a AM-FM broadcast transmitter; and/or means of another terminal device arranged to receive/transmit a communication signal; and/or an Internet of Things (IoT) device. A terminal device configured to communicate via a wireless interface may be referred to as a "wireless communication terminal", "wireless terminal" or "mobile terminal". Example of mobile terminals include, but are not limited to, satellite or cellular telephones; a Personal Communications System (PCS) terminal that may combine a cellular radio telephone with data processing, fax and data communications capability; a Personal Digital Assistant (PDA) that may include a radio telephone, a pager, Internet/intranet access, a Web browser, memo pad, calendar and/or Global Positioning System (GPS) receiver; and a conventional laptop and/or palmtop receiver or other electronic devices including a radio telephone transceiver. The terminal device may be referred to an access terminal, a User Equipment (UE), a subscriber unit, a subscriber station, a mobile station, a mobile radio station, a remote station, a remote terminal, a mobile device, a user terminal, a terminal, a wireless communication device, a user agent or a user device. The access terminal may be a cellular telephone, a cordless telephone, a Session Initiation Protocol (SIP) telephone, a Wireless Local Loop (WLL) station, a Personal Digital Assistant (PDA), a handheld device with a wireless communication function, a computing device or other processing device connected to a wireless modem, a vehicle-mounted device, a wearable device, a terminal device in a 5G network, a terminal device in a future evolved PLMN or the like.

In one example, Device to Device (D2D) communication may be performed between the terminal devices 120.

In one example, the 5G system or 5G network may also be referred to as a New Radio (NR) system or NR network.

FIG. 1 exemplarily illustrates one network device and two terminal devices. In one example, the communication system 100 may include multiple network devices and another number of terminal devices may be included within the coverage of each network device, which is not limited by the embodiments of the present disclosure.

In one example, the communication system 100 may also include other network entity such as a network controller or a mobility management entity, which is not limited in the embodiments of the present disclosure.

It is to be understood that a device with communication function in the network/system in the embodiments of the present disclosure may be referred to as a communication device. Taking the communication system 100 illustrated in FIG. 1 as an example, the communication device may include the network device 110 and the terminal device 120 with the communication function. The network device 110 and the terminal device 120 may be specific devices mentioned above, and details are not described herein. The communication device may also include other devices in the communication system 100, for example, other network entity such as the network controller or the mobility management entity, which is not limited in the embodiments of the present disclosure.

It is to be understood that terms "system" and "network" in the disclosure may usually be exchanged. In the disclosure, the term "and/or" is only an association relationship describing associated objects and represents that three relationships may exist. For example, A and/or B may represent three conditions: i.e., independent existence of A, existence of both A and B and independent existence of B. In addition, character "/" in the disclosure usually represents that previous and next associated objects form an "or" relationship.

In order to understand the features and technical contents of the embodiments of the present disclosure in more detail, the implementation of the embodiments of the present disclosure will be described in detail with reference to the accompanying drawings. The accompanying drawings are provided for illustration only and are not intended to limit the embodiments of the present disclosure.

First Embodiment

Figure 2:
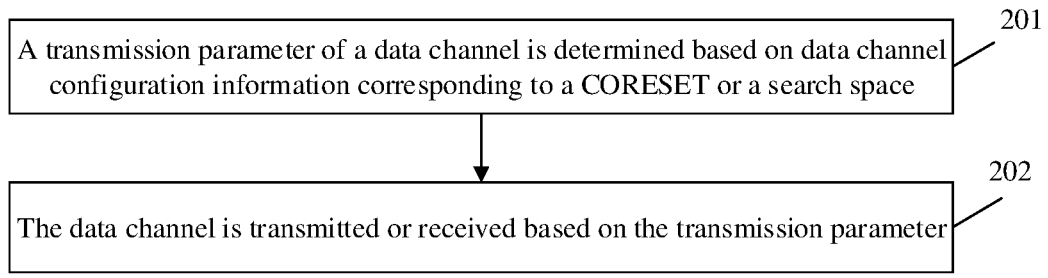
FIG. 2 is a first schematic flowchart of a method for data transmission according to an embodiment of the present disclosure.

The present embodiment provides a method for data transmission, which is applied to a terminal device. As illustrated in FIG. 2, the method includes the following operations.

In 201, a transmission parameter of a data channel is determined based on data channel configuration information corresponding to a control resource set (CORESET) or a search space.

In 202, the data channel is transmitted or received based on the transmission parameter.

The CORESET or the search space is a CORESET or a search space where downlink control information (DCI) for scheduling the data channel is detected; or, the CORESET or the search space is a CORESET or a search space using same quasi-co-location (QCL) type D assumption as a control channel for scheduling the data channel.

According to the existing protocol, QCL type D refers to a Spatial Rx Parameter.

In the present embodiment, the operation that the transmission parameter of the data channel is determined based on the data channel configuration information corresponding to the CORESET or the search space may be understood that it is necessary to determine the transmission parameter of the data channel scheduled by the DCI carried by the physical downlink control channel (PDCCH) firstly.

Specifically, the transmission parameter of the data channel may be determined based on the data channel configuration information corresponding to the CORESET or the search space where the DCI for scheduling the data channel is detected, or the transmission parameter of the data channel may be determined based on the data channel configuration information corresponding to the CORESET or the search space using the same QCL type D assumption as the control channel for scheduling the data channel. The control channel may be understood as the PDCCH. The CORESET or the search space being a CORESET or a search space using the same the QCL type D assumption as the control channel for scheduling the data channel may include the CORESET or the search space is a CORESET or a search space using same transmission configuration indication (TCI) state as the control channel for scheduling the data channel.

The method may also include the following operations.

The data channel configuration information corresponding to the CORESET or the search space is acquired through a higher layer signaling.

Specifically, the manners of acquiring the data channel configuration information through the higher layer signaling may include the following two manners.

In the first manner, the data channel configuration information corresponding to the CORESET or the search space configuration configured through the higher layer signaling is acquired from a network side.

The data channel configuration information may be specific configuration of the data channel or identification information corresponding to configuration of the data channel.

The data channel may be a downlink channel or an uplink channel, for example, may be a physical downlink shared channel (PDSCH) or a physical uplink shared channel (PUSCH), and also may be another channel, which will not be elaborated in the present embodiment.

That is, the network side may configure the corresponding data channel configuration information for one CORESET or search space through the higher layer signaling, for example, PDSCH-configuration (config) or PUSCH-config is added into a parameter field of the CORESET/search space, or PDSCH-config-ID or PUSCH-config-ID is added.

In the second manner, a correspondence, configured through a higher layer signaling, between identification information of the CORESET or the search space and identification information of the data channel configuration information is acquired from the network side.

The network side may additionally configure a correspondence between CORESET IDs and data channel configuration indexes (e.g., PDSCH-Config-ID/PUSCH-Config-ID) or a correspondence between search space IDs and data channel configuration indexes (e.g., PDSCH-Config-ID/PUSCH-Config-ID), and the data channel configuration information corresponding to the CORESET or the search space is determined based on the correspondence. A data channel configuration index may be an index of one data channel configuration information among multiple data channel configuration information configured on the network side.

In addition, it is to be noted that when the network side does not configure the data channel configuration information corresponding to the CORESET or the search space for the terminal device through the higher layer signaling, default data channel configuration information may be used to acquire the transmission parameter. The default data channel configuration information may be information preset by the network side for the terminal device, which may be acquired through information transmitted when the terminal device initially accesses the network side.

The method may also include the following operations.

The data channel configuration information used by a data channel transmitted in a same time slot or a same OFDM symbol as the CORESET or the search space is taken as the data channel configuration information corresponding to the CORESET or the search space.

That is, in addition to the manner of configuring the data channel configuration information for the CORESET or the search space through the higher layer signaling, the present embodiment also provides a processing manner for acquiring the data channel configuration information.

Specifically, the finally determined data channel configuration information corresponding to the CORESET or the search space may be data channel configuration information used by the data channel transmitted in the same time slot as the CORESET; or may be data channel configuration information used by the data channel transmitted in the same OFDM symbol as the CORESET; or may be data channel configuration information used by the data channel transmitted in the same time slot as the search space; or may be data channel configuration information used by the data channel transmitted in the same OFDM symbol as the search space.

The data channel transmitted in the same time slot as the CORESET or the search space may be transmitted on different OFDM symbols from the CORESET or the search space. The data channel transmitted in the same OFDM symbol as the CORESET or the search space may not overlap completely with time-domain resources of the CORESET or the search space, that is, only part of the OFDM symbols are overlapped.

The data channel configuration information is used to indicate the transmission parameter used by the data channel. The transmission parameter includes at least one of the following: a transmission scheme used by the data channel, a power control parameter, frequency-domain frequency hopping configuration, configuration of whether to perform discrete fourier transform (DFT) transformation, codebook subset constraint configuration, configuration of a maximum transmission layer number, transmission configuration of uplink control information (UCI) carried by the data channel, configuration of whether to allow pi/2-binary phase shift keying (BPSK) modulation of the DFT transformation, a scrambling ID used for scrambling of data carried by the data channel, demodulation reference signal (DMRS) configuration of the data channel, candidate transmission configuration indicator (TCI) states of the data channel, an interleaved resource unit from a virtual resource block (VRB) to a physical resource block (PRB), time-domain resource configuration of the data channel, a number of repetition times or a number of aggregated time slots of the data channel, rate matching resource configuration, size of a resource block group (RBG) used by resource allocation, a modulation coding scheme (MCS) table used by data transmission, zero-power channel state information-reference signal (CSI-RS) configuration or PRB bundling configuration.

Specifically, the transmission scheme used by the data channel is used to indicate whether the data channel uses transmission based on codebook or transmission based on non-codebook.

The power control parameter is used to indicate a parameter used by the data channel for uplink power control, which includes an open-loop power control parameter (Po, path loss factor), a closed-loop power control parameter, a path loss measurement reference signal or the like.

The frequency-domain frequency hopping configuration is used to indicate whether to allow frequency-domain frequency hopping and a specific manner of the frequency-domain frequency hopping.

The configuration of whether to perform DFT transformation is used to indicate whether a multiple access mode used is a DFT-S-OFDM or a CP-OFDM.

The codebook subset constraint configuration is used to indicate a codebook subset available in transmission based on a codebook.

The configuration of the maximum transmission layer number is used to indicate a maximum transmission layer number allowed for uplink or downlink data transmission.

The transmission configuration of UCI carried by the data channel is used to indicate a parameter used for calculating a resource occupied by the UCI.

The DMRS configuration of the data channel includes at least one of the following: a starting DMRS symbol position, a DMRS type, an additional DMRS position, a number of OFDM symbols occupied by a basic DMRS, a scrambling ID used by the DMRS or configuration of phase tracking reference signal (PTRS) associated with the DMRS.

The starting DMRS symbol position is used to indicate an OFDM symbol where a first DMRS symbol (i.e., a DMRS earliest transmitted in a time slot) is detected, for example, may be the third or fourth OFDM symbol.

The DMRS type is used to indicate whether to use type 1 DMRS or type 2 DMRS.

The additional DMRS position is used to indicate positions of OFDM symbols occupied by other DMRSs except the basic DMRS.

The number of OFDM symbols occupied by the basic DMRS may be 1 or 2.

The scrambling ID used by the DMRS may be configured with two scrambling IDs.

A reference signal in the candidate TCI states of the data channel includes only a CSI-RS, or the reference signal in the candidate TCI states of the data channel includes the CSI-RS or a synchronization signal block (SSB).

Specifically, when the terminal is configured with multiple CORESETs or search spaces, a reference signal in the TCI state in the data channel configuration information corresponding to one CORESET or search space may be the SSB or the CSI-RS, and a reference signal in the TCI state in the data channel configuration information corresponding to other CORESETs or search spaces may only be the CSI-RS.

The TCI state is used to indicate reference downlink signals of different QCL types of the terminal, and data or QCL assumption used for signal detection may be acquired based on the reference downlink signals.

The interleaved resource unit from the VRB to the PRB is used to indicate resource units used by interleaving from the VRB to the PRB, such as 2 PRBs or 4 PRBs.

The time-domain resource configuration of the data channel is used to indicate time-domain resources occupied by the data channel in one time slot, such as a starting OFDM symbol, a number of occupied OFDM symbols or the like.

The number of repetition times or the number of aggregated time slots of the data channel is used to indicate a number of time slots successively occupied by the data channel. The time slots successively occupied are used to repeatedly transmit the same data channel.

The rate matching resource configuration is used to indicate a physical resource on which rate matching is required to be performed.

The rate matching resource configuration includes a physical resource occupied by the SSB. That is, when the data channel configuration information includes the rate matching resource configuration, the rate matching resource configuration includes the physical resource occupied by the SSB.

The size of the RBG used by resource allocation is used to indicate a resource unit of the frequency-domain resource allocation.

The PRB bundling configuration is used to indicate precoding granularity assumed by the terminal when performing channel estimation.

The zero-power CSI-RS configuration is used to indicate a resource for zero power CSI-RS transmission, and the resource is not used for data transmission.

In combination with the foregoing description, regarding the operation in 201 in the present embodiment, the operation that the transmission parameter of the data channel is determined based on the data channel configuration information corresponding to the CORESET or the search space includes the following actions.

A DCI is detected in at least one of the CORESET or the search space.

The data channel configuration information corresponding to the CORESET or the search space is determined based on the CORESET or the search space where the detected DCI is detected.

The transmission parameter of the data channel scheduled by the DCI is determined based on the data channel configuration information.

That is, the terminal device detects a DCI carried by the PDCCH in multiple CORESETs or search spaces, and determines the data channel configuration information corresponding to the CORESET or the search space based on the CORESET or the search space where the detected DCI is detected, so as to determine the transmission parameter of the data channel scheduled by the DCI.

When the terminal detects DCIs carried by the PDCCH in multiple CORESETs or search spaces, it is necessary to determine the transmission parameter of the data channel scheduled by each DCI according to the above method.

Regarding the operation in 202, the operation that the data channel is transmitted or received based on the transmission parameter includes at least one of the following actions.

The data channel is transmitted or received based on the transmission scheme used by the data channel.

Uplink transmit power is determined based on the power control parameter, and the data channel is transmitted based on the uplink transmit power.

Based on the frequency-domain frequency hopping configuration, whether to perform frequency-domain frequency hopping and a manner for determining a frequency-domain resource when the frequency-domain frequency hopping is performed are determined, and the frequency-domain resource used for transmitting or receiving the data channel is determined based on whether to perform frequency hopping and the manner for determining the frequency-domain resource when the frequency-domain frequency hopping is performed.

It is determined whether to perform DFT transformation on data based on the configuration of whether to perform DFT transformation, and the data channel subjected to the DFT transformation or non-DFT transformation is transmitted based on a result of whether to perform the DFT transformation.

A codebook subset available for precoding is determined based on the codebook subset constraint configuration, a precoding matrix used for transmitting the data channel is determined based on the codebook subset and precoding indication information from the network side, and the data channel is transmitted based on the determined precoding matrix.

A maximum transmission layer number allowed for the present data transmission is determined based on configuration of a maximum transmission layer number, content of scheduling request indicator/rank indicator (SRI/RI) indication field in the DCI is determined based on the maximum transmission layer number, and the data channel is transmitted based on the content of the SRI/RI indication field.

Based on the transmission configuration of UCI carried by the data channel, a physical resource occupied by the UCI is determined, and the UCI is transmitted in the physical resource on the data channel.

Based on the configuration of whether to allow pi/2-BPSK modulation of DFT transformation, it is determined whether to perform the DFT transformation on the data channel modulated by the pi/2-BPSK modulation and the data channel is transmitted.

Scrambling is performed on the data channel based on the scrambling ID used for scrambling of data channel, and the scrambled data channel is transmitted.

A physical resource and/or sequence of the DMRS are determined based on the DMRS configuration of the data channel, and the DMRS is transmitted or received on the data channel.

QCL assumption used for detection of the data channel is determined based on the candidate TCI states of the data channel and the TCI state indication information in the DCI, and the data channel is received based on the QCL assumption.

Interleaving from the VRB to the PRB is performed based on the interleaved resource unit from the VRB to the PRB, and physical resource mapping of the data channel is performed.

A time-domain resource occupied by the data channel in one time slot is determined based on the time-domain resource configuration of the data channel, and the data channel is transmitted or received on the time-domain resource.

The number of time slots successively occupied by the data channel is determined based on the number of repetition times or the number of aggregated time slots of the data channel, and the data channel is transmitted or received in a time slot corresponding to the number of time slots.

Rate matching of data carried by the data channel is performed based on the rate matching resource configuration, and the matched data is transmitted or received on the data channel.

A frequency-domain resource indicated by the DCI is determined based on the size of the RBG used by resource allocation, and the data channel is transmitted or received on the frequency domain resource.

A modulation coding scheme used by the data channel is determined based on the MCS table and MCS information indicated by the DCI, and the data channel is transmitted or received based on the modulation coding scheme.

Downlink channel estimation is performed based on the DMRS according to the PRB bundling configuration, and demodulation is performed on the received data channel based on a result of the downlink channel estimation.

A physical resource occupied by a zero-power CSI-RS resource is determined based on the zero-power CSI-RS configuration, and no transmission or reception of the data channel is performed on the physical resource.

The data channel is the PUSCH or the PDSCH.

Specifically, based on whether the data channel uses transmission based on codebook or transmission based on non-codebook indicated in the transmission scheme used by the data channel, it is determined whether to transmit or receive the data channel based on codebook or based on non-codebook.

The uplink transmit power is determined based on a open-loop power control parameter, a closed-loop power control parameter, a path loss measurement reference signal or the like in the power control parameter, and the data channel is transmitted based on the determined uplink transmit power.

It is determined whether to perform frequency-domain frequency hopping based on the frequency-domain frequency hopping configuration, and a manner for determining a frequency-domain resource when the frequency-domain frequency hopping is performed is determined based on the frequency-domain frequency hopping configuration, so the frequency-domain resource used for transmitting or receiving the data channel is determined based on whether to perform frequency hopping and the manner for determining the frequency-domain resource when the frequency-domain frequency hopping is performed.

It is determined whether to perform DFT transformation on the data based on the configuration of whether to perform DFT transformation, and the data channel subjected to the DFT transformation or non-DFT transformation is transmitted based on the result of whether to perform the DFT transformation. Specifically, it may be determined that the multiple access mode used is DFT-S-OFDM or CP-OFDM based on configuration of the DFT transformation, and the data channel is transmitted based on the determined configuration.

Based on the transmission configuration of UCI carried by the data channel, a physical resource occupied by the UCI is determined, and the UCI is transmitted in the physical resource on the data channel. That is, the resource occupied by the UCI is determined based on the parameter used for calculating the resource occupied by the UCI, and then the UCI is transmitted on the data channel.

Based on the configuration of whether to allow pi/2-BPSK modulation of DFT transformation, it is determined whether to perform the DFT transformation on the data channel modulated by the pi/2-BPSK modulation, and the transformed or untransformed data channel is transmitted.

The physical resource and/or sequence of the DMRS are determined based on DMRS configuration of the data channel, and the DMRS is transmitted or received on the data channel. For example, the physical resource of the DMRS is determined based on the DMRS parameters, such as the starting symbol position, the type or the like, and the DMRS is transmitted on the data channel. In one example, the physical resource of the DMRS may be determined based on DMRS configuration, such as the scrambling ID or the number of OFDM symbols, etc., and the DMRS is transmitted on the data channel.

The QCL assumption used for detection of the data channel is determined based on the candidate TCI states of the data channel and the TCI state indication information in the DCI, and the data channel is received based on the QCL assumption. For example, in response to that the terminal is configured with multiple CORESETs or search spaces, a reference signal in the TCI state of the data channel configuration information corresponding to one of the CORESETs or search spaces may be the SSB or the CSI-RS, and a reference signal in the TCI state of the data channel configuration information corresponding to other CORESETs or search spaces may only be the CSI-RS. In response to that the reference signal in the TCI includes the CSI-RS, QCL assumptions used for detection of the data channel when the data channel is received are determined, and then the QCL assumption used for detection of the data channel when the data channel is received is determined by using the CSI-RS or the SSB.

Based on the interleaved resource unit from the VRB to the PRB, interleaving from the VRB to the PRB is performed, so the physical resource mapping of the data channel is performed, and the mapped data channel is transmitted. For example, in response to that the resource unit used for interleaving is 2 PRB, the physical resource mapping of the data channel is performed after interleaving is performed based on 2 PRB.

According to the precoding granularity assumed when the terminal performs channel estimation indicated in the PRB bundling configuration, the downlink channel estimation is performed based on the DMRS, and demodulation of the data channel is performed based on the result of the downlink channel estimation.

With the above solutions, the transmission parameter of the data channel may be determined based on data channel configuration information corresponding to the CORESET or the search space and then the data channel is transmitted or received based on the transmission parameter. In this way, since data channel configuration information corresponding to different CORESETs or search spaces may be different, different data channels may have corresponding different data channel configuration information, thereby ensuring that multiple data channels may use independent data channel configuration information and improving the flexibility of scheduling. Furthermore, based on the methods of the present disclosure, different data channel configuration information may be used for data channels scheduled by different TRPs or panels, so that interference between different data channels is reduced, thereby ensuring performance of data transmission.

Second Embodiment

Figure 3:
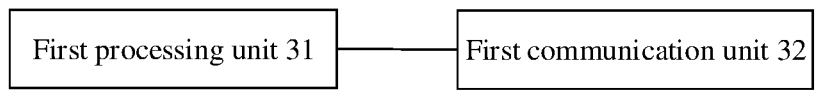
FIG. 3 is a schematic structural diagram of a terminal device according to an embodiment of the present disclosure.

The present embodiment provides a terminal device, as illustrated in FIG. 3, the terminal device includes a first processing unit 31 and a first communication unit 32.

The first processing unit 31 is configured to determine a transmission parameter of a data channel based on data channel configuration information corresponding to a CORESET or a search space.

The first communication unit 32 is configured to transmit or receive the data channel based on the transmission parameter.

The CORESET or the search space is a CORESET or a search space where DCI for scheduling the data channel is detected; or, the CORESET or the search space is a CORESET or a search space using same QCL type D assumption as a control channel for scheduling the data channel.

According to the existing protocol, QCL type D refers to a Spatial Rx Parameter.

In the present embodiment, the operation that the transmission parameter of the data channel is determined based on the data channel configuration information corresponding to the CORESET or the search space may be understood that it is necessary to determine the transmission parameter of the data channel scheduled by the DCI carried by the PDCCH firstly.

Specifically, the transmission parameter of the data channel may be determined based on the data channel configuration information corresponding to the CORESET or the search space where the DCI for scheduling the data channel is detected, or the transmission parameter of the data channel may be determined based on the data channel configuration information corresponding to the CORESET or the search space using the same QCL type D assumption as the control channel for scheduling the data channel. The control channel may be understood as the PDCCH. The CORESET or the search space being a CORESET or a search space using the same the QCL type D assumption as the control channel for scheduling the data channel may include that the CORESET or the search space is a CORESET or a search space using same TCI state as the control channel for scheduling the data channel.

The first communication unit 32 is configured to acquire the data channel configuration information corresponding to the CORESET or the search space through a higher layer signaling.

Specifically, the manners of acquiring the data channel configuration information through the higher layer signaling may include the following two manners.

In the first manner, the data channel configuration information corresponding to the CORESET or the search space configuration configured through the higher layer signaling is acquired from a network side.

The data channel configuration information may be specific configuration of the data channel or identification information corresponding to configuration of the data channel.

The data channel may be a downlink channel or an uplink channel, for example, may be a PDSCH or a PUSCH, and also may be another channel, which will not be elaborated in the present embodiment.

That is, the network side may configure the corresponding data channel configuration information for one CORESET or search space through the higher layer signaling, for example, PDSCH-configuration (config) or PUSCH-config is added into a parameter field of the CORESET/search space, or PDSCH-config-ID or PUSCH-config-ID is added.

In the second manner, a correspondence, configured through the higher layer signaling, between identification information of the CORESET or the search space and identification information of the data channel configuration information is acquired from the network side.

The network side may additionally configure a correspondence between CORESET IDs and data channel configuration indexes (e.g., PDSCH-Config-ID/PUSCH-Config-ID) or a correspondence between search space IDs and the data channel configuration indexes (e.g., PDSCH-Config-ID/PUSCH-Config-ID), and the data channel configuration information corresponding to the CORESET or the search space is determined based on the correspondence. A data channel configuration index may be an index of one data channel configuration information among multiple data channel configuration information configured on the network side.

In addition, it is to be noted that when the network side does not configure the data channel configuration information corresponding to one CORESET or search space for the terminal device through the higher layer signaling, default data channel configuration information may be used to acquire the transmission parameter. The default data channel configuration information may be information preset by the network side for the terminal device, which may be acquired through information transmitted when the terminal device initially accesses the network side.

The first processing unit 31 is configured to take data channel configuration information used by a data channel transmitted in a same time slot or a same OFDM symbol as the CORESET or the search space as the data channel configuration information corresponding to the CORESET or the search space.

That is, in addition to the manner of configuring the data channel configuration information for the CORESET or the search space through the higher layer signaling, the present embodiment also provides a processing manner for acquiring the data channel configuration information.

Specifically, the finally determined data channel configuration information corresponding to the CORESET or the search space may be data channel configuration information used by the data channel transmitted in the same time slot as the CORESET; or may be data channel configuration information used by the data channel transmitted in the same OFDM symbol as the CORESET; or may be data channel configuration information used by the data channel transmitted in the same time slot as the search space; or may be data channel configuration information used by the data channel transmitted in the same OFDM symbol as the search space.

The data channel transmitted in the same time slot as the CORESET or the search space may be transmitted on different OFDM symbols from the CORESET or the search space. The data channel transmitted in the same OFDM symbol as the CORESET or the search space may not overlap completely with time-domain resources of the CORESET or the search space, that is, only part of the OFDM symbols are overlapped.

The data channel configuration information is used to indicate the transmission parameter used by the data channel. The transmission parameter includes at least one of the following: a transmission scheme used by the data channel, a power control parameter, frequency-domain frequency hopping configuration, configuration of whether to perform DFT transformation, codebook subset constraint configuration, configuration of a maximum transmission layer number, transmission configuration of UCI carried by the data channel, configuration of whether to allow pi/2-BPSK modulation of the DFT transformation, a scrambling ID used for scrambling of data carried by the data channel, DMRS configuration of the data channel, candidate TCI states of the data channel, an interleaved resource unit from a VRB to a PRB, time-domain resource configuration of the data channel, a number of repetition times or a number of aggregated time slots of the data channel, rate matching resource configuration, size of a RBG used by resource allocation, a MCS table used by data transmission, zero-power CSI-RS configuration or PRB bundling configuration.

Specifically, the transmission scheme used by the data channel is used to indicate whether the data channel uses transmission based on codebook or transmission based on non-codebook.

The power control parameter is used to indicate a parameter used by the data channel for uplink power control, which includes an open-loop power control parameter (Po, path loss factor), a closed-loop power control parameter, a path loss measurement reference signal or the like.

The frequency-domain frequency hopping configuration is used to indicate whether to allow frequency-domain frequency hopping and a specific manner of the frequency-domain frequency hopping.

The configuration of whether to perform DFT transformation is used to indicate whether a multiple access mode used is a DFT-S-OFDM or a CP-OFDM.

The codebook subset constraint configuration is used to indicate a codebook subset available in transmission based on a codebook.

The configuration of the maximum transmission layer number is used to indicate a maximum transmission layer number allowed for uplink or downlink data transmission.

The transmission configuration of UCI carried by the data channel is used to indicate a parameter used for calculating a resource occupied by the UCI.

The DMRS configuration of the data channel includes at least one of the following: a starting DMRS symbol position, a DMRS type, an additional DMRS position, a number of OFDM symbols occupied by a basic DMRS, a scrambling ID used by the DMRS or configuration of PTRS associated with the DMRS.

The starting DMRS symbol position is used to indicate an OFDM symbol position where a first DMRS symbol (i.e., a DMRS earliest transmitted in a time slot) is detected, for example, may be the third or fourth OFDM symbol.

The DMRS type is used to indicate whether to use type 1 DMRS or type 2 DMRS.

The additional DMRS position is used to indicate positions of OFDM symbols occupied by other DMRSs except the basic DMRS.

The number of OFDM symbols occupied by the basic DMRS may be 1 or 2.

The scrambling ID used by the DMRS may be configured with two scrambling IDs.

A reference signal in the candidate TCI states of the data channel includes only a CSI-RS, or the reference signal in the candidate TCI states of the data channel includes the CSI-RS or an SSB.

Specifically, in response to that the terminal is configured with multiple CORESETs or search spaces, a reference signal in the TCI state of the data channel configuration information corresponding to one CORESET or search space may be the SSB or the CSI-RS, and a reference signal in the TCI state of the data channel configuration information corresponding to other CORESETs or search spaces may only be the CSI-RS.

The TCI state is used to indicate reference downlink signals of different QCL types of the terminal, and the data or the QCL assumption used by signal detection may be acquired based on the reference downlink signals.

The interleaved resource unit from the VRB to the PRB is used to indicate the resource units used by interleaving from the VRB to the PRB, such as 2 PRBs or 4 PRBs.

The time-domain resource configuration of the data channel is used to indicate time-domain resources occupied by the data channel in one time slot, such as a starting OFDM symbol, a number of occupied OFDM symbols or the like.

The number of repetition times or the number of aggregated time slots of the data channel is used to indicate a number of time slots successively occupied by the data channel. The time slots successively occupied are used to repeatedly transmit the same data channel.

The rate matching resource configuration is used to indicate a physical resource on which rate matching is required to be performed.

The rate matching resource configuration includes a physical resource occupied by the SSB. That is, in response to that the data channel configuration information includes the rate matching resource configuration, the rate matching resource configuration includes the physical resource occupied by the SSB.

The size of the RBG used by resource allocation is used to indicate a resource unit of the frequency-domain resource allocation.

The PRB bundling configuration is used to indicate precoding granularity assumed by the terminal when performing channel estimation.

The zero-power CSI-RS configuration is used to indicate a resource for zero power CSI-RS transmission, and the resource is not used for data transmission.

In combination with the foregoing description, the first processing unit 31 is configured to detect a DCI in at least one CORESET or search space, determine the data channel configuration information corresponding to the CORESET or the search space based on the CORESET or the search space where the detected DCI is detected, and determine the transmission parameter of the data channel scheduled by the DCI based on the data channel configuration information.

That is, the terminal device detects a DCI carried by the PDCCH in multiple CORESETs or search spaces, and determines the data channel configuration information corresponding to the CORESET or the search space based on the CORESET or the search space where the detected DCI is detected, so as to determine the transmission parameter of the data channel scheduled by the DCI.

When the terminal detects DCIs carried by the PDCCH in multiple CORESETs or search spaces, it is necessary to determine the transmission parameter of the data channel scheduled by each DCI according to the above method.

The first communication unit 32 is configured to perform at least one of the operations.

The data channel is transmitted or received based on the transmission scheme used by the data channel.

Uplink transmit power is determined based on the power control parameter, and the data channel is transmitted based on the uplink transmit power.

Based on the frequency-domain frequency hopping configuration, whether to perform frequency-domain frequency hopping and a manner for determining a frequency-domain resource when the frequency-domain frequency hopping is performed are determined, and the frequency-domain resource used for transmitting or receiving the data channel is determined based on whether to perform frequency hopping and the manner for determining the frequency-domain resource when the frequency-domain frequency hopping is performed.

It is determined whether to perform DFT transformation on data based on the configuration of whether to perform DFT transformation, and the data channel subjected to the DFT transformation or non-DFT transformation is transmitted based on a result of whether to perform the DFT transformation.

A codebook subset available for precoding is determined based on the codebook subset constraint configuration, a precoding matrix used for transmitting the data channel is determined based on the codebook subset and precoding indication information from the network side, and the data channel is transmitted based on the determined precoding matrix.

A maximum transmission layer number allowed for the present data transmission is determined based on configuration of a maximum transmission layer number, content of scheduling request indicator/rank indicator (SRI/RI) indication field in the DCI is determined based on the maximum transmission layer number, and the data channel is transmitted based on the content of the SRI/RI indication field.

Based on the transmission configuration of UCI carried by the data channel, a physical resource occupied by the UCI is determined, and the UCI is transmitted in the physical resource on the data channel.

Based on the configuration of whether to allow pi/2-BPSK modulation of DFT transformation, it is determined whether to perform the DFT transformation on the data channel modulated by the pi/2-BPSK modulation and the data channel is transmitted.

Scrambling is performed on the data channel based on the scrambling ID used for scrambling of data channel, and the scrambled data channel is transmitted.

A physical resource and/or sequence of the DMRS are determined based on the DMRS configuration of the data channel, and the DMRS is transmitted or received on the data channel.

QCL assumption used for detection of the data channel is determined based on the candidate TCI states of the data channel and the TCI state indication information in the DCI, and the data channel is received based on the QCL assumption.

Interleaving from the VRB to the PRB is performed based on the interleaved resource unit from the VRB to the PRB, and physical resource mapping of the data channel is performed.

A time-domain resource occupied by the data channel in one time slot is determined based on the time-domain resource configuration of the data channel, and the data channel is transmitted or received on the time-domain resource.

The number of time slots successively occupied by the data channel is determined based on the number of repetition times or the number of aggregated time slots of the data channel, and the data channel is transmitted or received in a time slot corresponding to the number of time slots.

Rate matching of data carried by the data channel is performed based on the rate matching resource configuration, and the matched data is transmitted or received on the data channel.

A frequency-domain resource indicated by the DCI is determined based on the size of the RBG used by resource allocation, and the data channel is transmitted or received on the frequency domain resource.

A modulation coding scheme used by the data channel is determined based on the MCS table and MCS information indicated by the DCI, and the data channel is transmitted or received based on the modulation coding scheme.

Downlink channel estimation is performed based on the DMRS according to the PRB bundling configuration, and demodulation is performed on the received data channel based on a result of the downlink channel estimation.

A physical resource occupied by a zero-power CSI-RS resource is determined based on the zero-power CSI-RS configuration, and no transmission or reception of the data channel is performed on the physical resource.

The data channel is the PUSCH or the PDSCH.

Specifically, based on whether the data channel uses transmission based on codebook or transmission based on non-codebook indicated in the transmission scheme used by the data channel, it is determined whether to transmit or receive the data channel based on codebook or based on non-codebook.

The uplink transmit power is determined based on an open-loop power control parameter, a closed-loop power control parameter, a path loss measurement reference signal or the like in the power control parameter, and the data channel is transmitted based on the determined uplink transmit power.

It is determined whether to perform frequency-domain frequency hopping based on the frequency-domain frequency hopping configuration, and a manner for determining a frequency-domain resource when the frequency-domain frequency hopping is performed is determined based on the frequency-domain frequency hopping configuration, so the frequency-domain resource used for transmitting or receiving the data channel is determined based on whether to perform frequency hopping and the manner for determining the frequency-domain resource when the frequency-domain frequency hopping is performed.

It is determined whether to perform DFT transformation on the data based on the configuration of whether to perform DFT transformation, and the data channel subjected to the DFT transformation or non-DFT transformation is transmitted based on the result of whether to perform the DFT transformation. Specifically, it may be determined that the multiple access mode used is DFT-S-OFDM or CP-OFDM based on configuration of the DFT transformation, and the data channel is transmitted based on the determined configuration.

A codebook subset available for precoding is determined based on the codebook subset constraint configuration; the precoding matrix used for transmitting the data channel is determined based on the codebook subset and precoding indication information from the network side, and the data channel is transmitted based on the determined precoding matrix.

Based on the transmission configuration of UCI carried by the data channel, the physical resource occupied by the UCI is determined, and the UCI is transmitted in the physical resource on the data channel. That is, the resource occupied by the UCI is determined based on the parameter used for calculating the resource occupied by the UCI, and then the UCI is transmitted on the data channel.

Based on the configuration of whether to allow pi/2-BPSK modulation of DFT transformation, it is determined whether to perform the DFT transformation on the data channel modulated by the pi/2-BPSK modulation, and the transformed or untransformed data channel is transmitted.

The physical resource and/or sequence of the DMRS are determined based on DMRS configuration of the data channel, and the DMRS is transmitted or received on the data channel. For example, the physical resource of the DMRS is determined based on the DMRS parameters, such as the starting symbol position, the type or the like, and the DMRS is transmitted on the data channel. In one example, the physical resource of the DMRS may be determined based on DMRS configuration, such as the scrambling ID or the number of OFDM symbols, etc., and the DMRS is transmitted on the data channel.

The QCL assumption used for detection of the data channel is determined based on the candidate TCI states of the data channel and the TCI state indication information in the DCI, and the data channel is received based on the QCL assumption. For example, when the reference signal in the TCI includes the CSI-RS, QCL assumptions used for detection of the data channel when the data channel is received are determined, and then the QCL assumption used for detection of the data channel when the data channel is received is determined by using the CSI-RS or the SSB.

Based on the interleaved resource unit from the VRB to the PRB, interleaving from the VRB to the PRB is performed, so the physical resource mapping of the data channel is performed, and the mapped data channel is transmitted. For example, in response to that the resource unit used for interleaving is 2 PRB, the physical resource mapping of the data channel is performed after interleaving is performed based on 2 PRB.

According to the precoding granularity assumed when the terminal performs channel estimation indicated in the PRB bundling configuration, the downlink channel estimation is performed based on the DMRS, and demodulation of the data channel is performed based on the result of the downlink channel estimation.

With the above solutions, the transmission parameter of the data channel may be determined based on data channel configuration information corresponding to the CORESET or the search space and then the data channel is transmitted or received based on the transmission parameter. In this way, since data channel configuration information corresponding to different CORESETs or search spaces may be different, different data channels may have corresponding different data channel configuration information, thereby ensuring that multiple data channels may use independent data channel configuration information and improving the flexibility of scheduling. Furthermore, based on the methods of the present disclosure, different data channel configuration information may be used for data channels scheduled by different TRPs or panels, so that interference between different data channels is reduced, thereby ensuring performance of data transmission.

Third Embodiment

Figure 4:
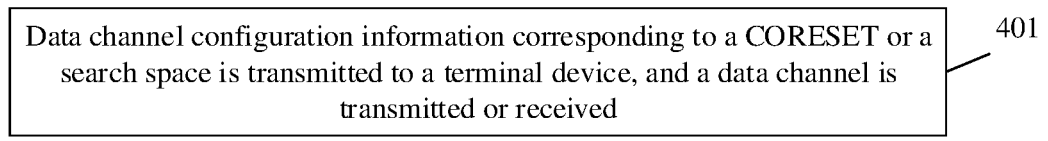
FIG. 4 is a second schematic flowchart of a method for data transmission according to an embodiment of the present disclosure.

The present embodiment provides a method for data transmission, which is applied to a network device. As illustrated in FIG. 4, the method includes the following operations.

In 401, data channel configuration information corresponding to a CORESET or a search space is transmitted to a terminal device, and a data channel is transmitted or received.

The CORESET or the search space is a CORESET or a search space where DCI for scheduling the data channel is detected; or, the CORESET or the search space is a CORESET or a search space using same QCL type D assumption as a control channel for scheduling the data channel.

According to the existing protocol, QCL type D refers to a Spatial Rx Parameter.

In the present embodiment, the operation of determining the transmission parameter of the data channel based on the data channel configuration information corresponding to the CORESET or the search space may be understood that it is necessary to determine the transmission parameter of the data channel scheduled by the DCI carried by the PDCCH firstly.

Specifically, the transmission parameter of the data channel may be determined based on the data channel configuration information corresponding to the CORESET or the search space where the DCI for scheduling the data channel is detected, or the transmission parameter of the data channel may be determined based on the data channel configuration information corresponding to the CORESET or the search space using the same QCL type D assumption as the control channel for scheduling the data channel. The control channel may be understood as the PDCCH. The CORESET or the search space being a CORESET or a search space using the same the QCL type D assumption as the control channel for scheduling the data channel includes that the CORESET or the search space is a CORESET or a search space using same TCI state as the control channel for scheduling the data channel.

The abovementioned operation that the data channel configuration information corresponding to the CORESET or the search space is transmitted to the terminal device may include the following two manners.

In the first manner, the data channel configuration information corresponding to the CORESET or the search space is transmitted to the terminal device through a higher layer signaling.

The data channel configuration information may be specific configuration of the data channel or identification information corresponding to configuration of the data channel.

The data channel may be a downlink channel or an uplink channel, for example, may be a PDSCH or a PUSCH, and also may be another channel, which will not be elaborated in the present embodiment.

That is, the network side may configure the corresponding data channel configuration information for one CORESET or search space through the higher layer signaling, for example, PDSCH-configuration (config) or PUSCH-config is added into a parameter field of the CORESET/search space, or PDSCH-config-ID or PUSCH-config-ID is added.

In the second manner, a correspondence between identification information of the CORESET or the search space and identification information of the data channel configuration information is transmitted to the terminal device through a higher layer signaling.

The network side may additionally configure a correspondence between CORESET IDs and data channel configuration indexes (e.g., PDSCH-Config-ID/PUSCH-Config-ID) or a correspondence between search space IDs and data channel configuration indexes (e.g., PDSCH-Config-ID/PUSCH-Config-ID), and the data channel configuration information corresponding to the CORESET or the search space is determined based on the correspondence. A data channel configuration index may be an index of one data channel configuration information among multiple data channel configuration information configured on the network side.

In addition, it is to be noted that when the network side does not configure the data channel configuration information corresponding to one CORESET or search space for the terminal device through the higher layer signaling, default data channel configuration information may be used to acquire the transmission parameter. The default data channel configuration information may be information preset by the network side for the terminal device, and the acquisition manner may be that the network device configures the default data channel configuration information to the terminal through information transmitted with the terminal when the terminal device initially accesses the network side.

The determined data channel configuration information corresponding to the CORESET or the search space in the present embodiment may be data channel configuration information used by the data channel transmitted in the same time slot as the CORESET; or may be data channel configuration information used by the data channel transmitted in the same OFDM symbol as the CORESET; or may be data channel configuration information used by the data channel transmitted in the same time slot as the search space; or may be data channel configuration information used by the data channel transmitted in the same OFDM symbol as the search space.

The data channel transmitted in the same time slot as the CORESET or the search space may be transmitted on different OFDM symbols from the CORESET or the search space. The data channel transmitted in the same OFDM symbol as the CORESET or the search space may not overlap completely with time-domain resources of the CORESET or the search space, that is, only part of the OFDM symbols are overlapped.

The data channel configuration information is used to indicate the transmission parameter used by the data channel. The transmission parameter includes at least one of the following: a transmission scheme used by the data channel, a power control parameter, frequency-domain frequency hopping configuration, configuration of whether to perform DFT transformation, codebook subset constraint configuration, configuration of a maximum transmission layer number, transmission configuration of UCI carried by the data channel, configuration of whether to allow pi/2-BPSK modulation of the DFT transformation, a scrambling ID used for scrambling of data carried by the data channel, DMRS configuration of the data channel, candidate TCI states of a data channel, an interleaved resource unit from a VRB to a PRB, time-domain resource configuration of the data channel, a number of repetition times or a number of aggregated time slots of the data channel, rate matching resource configuration, size of a RBG used by resource allocation, a MCS table used by data transmission, zero-power CSI-RS configuration or PRB bundling configuration.

Specifically, the transmission scheme used by the data channel is used to indicate whether the data channel uses transmission based on codebook or transmission based on non-codebook.

The power control parameter is used to indicate a parameter used by the data channel for uplink power control, which includes an open-loop power control parameter (Po, path loss factor), a closed-loop power control parameter, a path loss measurement reference signal or the like.

The frequency-domain frequency hopping configuration is used to indicate whether to allow frequency-domain frequency hopping and a specific manner of the frequency-domain frequency hopping.

The configuration of whether to perform DFT transformation is used to indicate whether a multiple access mode used is a DFT-S-OFDM or a CP-OFDM.

The codebook subset constraint configuration is used to indicate a codebook subset available in transmission based on a codebook.

The configuration of the maximum transmission layer number is used to indicate a maximum transmission layer number allowed for uplink or downlink data transmission.

The transmission configuration of UCI carried by the data channel is used to indicate a parameter used for calculating a resource occupied by the UCI.

The DMRS configuration of the data channel includes at least one of the following: a starting DMRS symbol position, a DMRS type, an additional DMRS position, a number of OFDM symbols occupied by a basic DMRS, a scrambling ID used by the DMRS or configuration of PTRS associated with the DMRS.

The starting DMRS symbol position is used to indicate an OFDM symbol where a first DMRS symbol (i.e., a DMRS earliest transmitted in a time slot) is detected, for example, may be the third or fourth OFDM symbol.

The DMRS type is used to indicate whether to use type 1 DMRS or type 2 DMRS.

The additional DMRS position is used to indicate positions of OFDM symbols occupied by other DMRSs except the basic DMRS.

The number of OFDM symbols occupied by the basic DMRS may be 1 or 2.

The scrambling ID used by the DMRS may be configured with two scrambling IDs.

A reference signal in the candidate TCI states of the data channel includes only a CSI-RS, or the reference signal in the candidate TCI states of the data channel includes the CSI-RS or an SSB.

Specifically, when multiple CORESETs or search spaces are configured, a reference signal in the TCI state of the data channel configuration information corresponding to one CORESET or search space may be the SSB or the CSI-RS, and a reference signal in the TCI state of the data channel configuration information corresponding to other CORESETs or search spaces may only be the CSI-RS.

The TCI state is used to indicate reference downlink signals of different QCL types of the terminal, and data or QCL assumption used for signal detection may be acquired based on the reference downlink signals.

The interleaved resource unit from the VRB to the PRB is used to indicate resource units used by interleaving from the VRB to the PRB, such as 2 PRBs or 4 PRBs.

The time-domain resource configuration of the data channel is used to indicate time-domain resources occupied by the data channel in one time slot, such as a starting OFDM symbol, a number of occupied OFDM symbols or the like.

The number of repetition times or the number of aggregated time slots of the data channel is used to indicate a number of time slots successively occupied by the data channel. The time slots successively occupied are used to repeatedly transmit the same data channel.

The rate matching resource configuration is used to indicate a physical resource on which rate matching is required to be performed.

The rate matching resource configuration includes a physical resource occupied by the SSB. That is, when the data channel configuration information includes the rate matching resource configuration, the rate matching resource configuration includes the physical resource occupied by the SSB.

The size of the RBG used by resource allocation is used to indicate a resource unit of the frequency-domain resource allocation.

The PRB bundling configuration is used to indicate precoding granularity assumed by the terminal when performing channel estimation.

The zero-power CSI-RS configuration is used to indicate a resource for zero power CSI-RS transmission, and the resource is not used for data transmission.

With the above solutions, the transmission parameter of the data channel may be determined based on data channel configuration information corresponding to the CORESET or the search space and then the data channel is transmitted or received based on the transmission parameter. In this way, since the data channel configuration information corresponding to different CORESETs or search spaces may be different, different data channels may have corresponding different data channel configuration information, thereby ensuring that multiple data channels may use independent data channel configuration information and improving the flexibility of scheduling. Furthermore, based on the methods of the present disclosure, different data channel configuration information may be used for data channels scheduled by different TRPs or panels, so that interference between different data channels is reduced, thereby ensuring performance of data transmission.

Fourth Embodiment

The present embodiment provides a network device. As illustrated in FIG. 5, the network device includes a second communication unit 51.

The second communication unit 51 is configured to transmit data channel configuration information corresponding to a CORESET or a search space to a terminal device, and transmit or receive a data channel.

The CORESET or the search space is a CORESET or a search space where DCI for scheduling the data channel is detected; or, the CORESET or the search space is a CORESET or a search space using same QCL type D assumption as a control channel for scheduling the data channel.

According to the existing protocol, QCL type D refers to a Spatial Rx Parameter.

In the present embodiment, the operation of determining the transmission parameter of the data channel based on the data channel configuration information corresponding to the CORESET or the search space may be understood that it is necessary to determine the transmission parameter of the data channel scheduled by the DCI carried by the PDCCH firstly.

Specifically, the transmission parameter of the data channel may be determined based on the data channel configuration information corresponding to the CORESET or the search space where the DCI for scheduling the data channel is detected, or the transmission parameter of the data channel may be determined based on the data channel configuration information corresponding to the CORESET or the search space using the same QCL type D assumption as the control channel for scheduling the data channel. The control channel may be understood as the PDCCH. The CORESET or the search space being a CORESET or a search space using the same the QCL type D assumption as the control channel for scheduling the data channel includes: the CORESET or the search space is a CORESET or a search space using same TCI state as the control channel for scheduling the data channel.

The second communication unit 51 configures the data channel configuration information corresponding to the CORESET or the search space for the terminal device through a higher layer signaling. Specifically, the following two manners may be included.

In the first manner, the data channel configuration information corresponding to the CORESET or the search space is configured for the terminal device through a higher layer signaling.

The data channel configuration information may be specific configuration of the data channel or identification information corresponding to configuration of the data channel.

The data channel may be a downlink channel or an uplink channel, for example, may be a PDSCH or a PUSCH, and also may be another channel, which will not be elaborated in the present embodiment.

That is, the network side may configure the corresponding data channel configuration information for one CORESET or search space through the higher layer signaling, for example, PDSCH-configuration (config) or PUSCH-config is added into a parameter field of the CORESET/search space, or PDSCH-config-ID or PUSCH-config-ID is added.

In the second manner, a correspondence between identification information of the CORESET or the search space and identification information of the data channel configuration information is configured for the terminal device through the higher layer signaling.

The network side may additionally configure a correspondence between CORESET IDs and data channel configuration indexes (e.g., PDSCH-Config-ID/PUSCH-Config-ID) or a correspondence between search space IDs and data channel configuration indexes (e.g., PDSCH-Config-ID/PUSCH-Config-ID), and the data channel configuration information corresponding to the CORESET or the search space is determined based on the correspondence. A data channel configuration index may be an index of one data channel configuration information among multiple data channel configuration information configured on the network side.

In addition, it is to be noted that when the network side does not configure the data channel configuration information corresponding to one CORESET or search space for the terminal device through the higher layer signaling, default data channel configuration information may be used to acquire the transmission parameter. The default data channel configuration information may be information preset by the network side for the terminal device, and the acquisition manner may be that the second communication unit 51 in the network device configures the default data channel configuration information to the terminal through the information transmitted with the terminal when the terminal device initially accesses the network side.

The determined data channel configuration information corresponding to the CORESET or the search space in the present embodiment may be data channel configuration information used by the data channel transmitted in the same time slot as the CORESET; or may be data channel configuration information used by the data channel transmitted in the same OFDM symbol as the CORESET; or may be data channel configuration information used by the data channel transmitted in the same time slot as the search space; or may be data channel configuration information used by the data channel transmitted in the same OFDM symbol as the search space.

The data channel transmitted in the same time slot as the CORESET or the search space may be transmitted on different OFDM symbols from the CORESET or the search space. The data channel transmitted in the same OFDM symbol as the CORESET or the search space may not overlap completely with time-domain resources of the CORESET or the search space, that is, only part of the OFDM symbols are overlapped.

The data channel configuration information is used to indicate the transmission parameter used by the data channel. The transmission parameter includes at least one of the following: a transmission scheme used by the data channel, a power control parameter, frequency-domain frequency hopping configuration, configuration of whether to perform DFT transformation, codebook subset constraint configuration, configuration of a maximum transmission layer number, transmission configuration of UCI carried by the data channel, configuration of whether to allow pi/2-BPSK modulation of the DFT transformation, a scrambling ID used for scrambling of data carried by the data channel, DMRS configuration of the data channel, candidate TCI states of a data channel, an interleaved resource unit from a VRB to a PRB, time-domain resource configuration of the data channel, a number of repetition times or a number of aggregated time slots of the data channel, rate matching resource configuration, size of a RBG used by resource allocation, a MCS table used by data transmission, zero-power CSI-RS configuration or PRB bundling configuration.

Specifically, the transmission scheme used by the data channel is used to indicate whether the data channel uses transmission based on codebook or transmission based on non-codebook.

The power control parameter is used to indicate a parameter used by the data channel for uplink power control, which includes an open-loop power control parameter (Po, path loss factor), a closed-loop power control parameter, a path loss measurement reference signal or the like.

The frequency-domain frequency hopping configuration is used to indicate whether to allow frequency-domain frequency hopping and a specific manner of the frequency-domain frequency hopping.

The configuration of whether to perform DFT transformation is used to indicate whether a multiple access mode used is a DFT-S-OFDM or a CP-OFDM.

The codebook subset constraint configuration is used to indicate a codebook subset available in transmission based on a codebook.

The configuration of the maximum transmission layer number is used to indicate a maximum transmission layer number allowed for uplink or downlink data transmission.

The transmission configuration of UCI carried by the data channel is used to indicate a parameter used for calculating a resource occupied by the UCI.

The DMRS configuration of the data channel includes at least one of the following: a starting DMRS symbol position, a DMRS type, an additional DMRS position, a number of OFDM symbols occupied by a basic DMRS, a scrambling ID used by the DMRS or configuration of PTRS associated with the DMRS.

The starting DMRS symbol position is used to indicate an OFDM symbol where a first DMRS symbol (i.e., a DMRS earliest transmitted in a time slot) is detected, for example, may be the third or fourth OFDM symbol.

The DMRS type is used to indicate whether to use type 1 DMRS or type 2 DMRS.

The additional DMRS position is used to indicate positions of OFDM symbols occupied by other DMRSs except the basic DMRS.

The number of OFDM symbols occupied by the basic DMRS may be 1 or 2.

The scrambling ID used by the DMRS may be configured with two scrambling IDs.

A reference signal in the candidate TCI states of the data channel includes only a CSI-RS, or the reference signal in the candidate TCI states of the data channel includes the CSI-RS or an SSB.

Specifically, when multiple CORESETs or search spaces are configured, a reference signal in the TCI state of the data channel configuration information corresponding to one CORESET or search space may be the SSB or the CSI-RS, and a reference signal in the TCI state of the data channel configuration information corresponding to other CORESETs or search spaces may only be the CSI-RS.

The TCI state is used to indicate reference downlink signals of different QCL types of the terminal, and data or QCL assumption used for signal detection may be acquired based on the reference downlink signals.

The interleaved resource unit from the VRB to the PRB is used to indicate resource units used by interleaving from the VRB to the PRB, such as 2 PRBs or 4 PRBs.

The time-domain resource configuration of the data channel is used to indicate time-domain resources occupied by the data channel in one time slot, such as a starting OFDM symbol, a number of occupied OFDM symbols or the like.

The number of repetition times or the number of aggregated time slots of the data channel is used to indicate a number of time slots successively occupied by the data channel, and the time slots successively occupied are used to repeatedly transmit the same data channel.

The rate matching resource configuration is used to indicate a physical resource on which rate matching is required to be performed.

The rate matching resource configuration includes a physical resource occupied by the SSB. That is, when the data channel configuration information includes the rate matching resource configuration, the rate matching resource configuration includes the physical resource occupied by the SSB.

The size of the RBG used by resource allocation is used to indicate a resource unit of the frequency-domain resource allocation.

The PRB bundling configuration is used to indicate precoding granularity assumed by the terminal when performing channel estimation.

The zero-power CSI-RS configuration is used to indicate a resource for zero power CSI-RS transmission, and the resource is not used for data transmission.

With the above solutions, the transmission parameter of the data channel may be determined based on data channel configuration information corresponding to the CORESET or the search space and then the data channel is transmitted or received based on the transmission parameter. In this way, since the data channel configuration information corresponding to different CORESETs or search spaces may be different, different data channels may have corresponding different data channel configuration information, thereby ensuring that multiple data channels may use independent data channel configuration information and improving the flexibility of scheduling. Furthermore, based on the methods of the present disclosure, different data channel configuration information may be used for data channels scheduled by different TRPs or panels, so that interference between different data channels is reduced, thereby ensuring performance of data transmission.

FIG. 6 is a schematic structural diagram of a communication device 600 provided by the embodiments of the present disclosure. The communication device may be the terminal device or the network device described in the above embodiments. The communication device 600 illustrated in FIG. 6 includes a processor 610. The processor 610 can call a computer program from a memory and run the computer program to implement the method in the embodiments of the present disclosure.

In one example, as illustrated in FIG. 6, the communication device 600 may also include a memory 620. The processor 610 may call a computer program from the memory 620 and run the computer program to implement the method in the embodiments of the present disclosure.

The memory 620 may be a separate device from the processor 610, or may be integrated into the processor 610.

In one example, as illustrated in FIG. 6, the communication device 600 may also include a transceiver 630. The processor 610 may control the transceiver 630 to communicate with another device, specifically, to transmit information or data to another device, or receive information or data from another device.

The transceiver 630 may include a transmitter and a receiver. The transceiver 630 may further include one or more antennas.

In one example, the communication device 600 may be specifically the network device in the embodiments of the present disclosure. The communication device 600 may implement a corresponding process implemented by the network device in each method of the embodiments of the present disclosure, which will not be elaborated herein for brief description.

In one example, the communication device 600 may specifically be the terminal device or the network device in the embodiments of the present disclosure. The communication device 600 may implement a corresponding process implemented by the mobile terminal/terminal device in each method of the embodiments of the disclosure, which will not be elaborated herein for brief description.

FIG. 7 is a schematic structural diagram of a chip according to the embodiments of the present disclosure. The chip 700 illustrated in FIG. 7 includes a processor 710. The processor 710 can call a computer program from a memory and run the computer program to implement the method in the embodiments of the present disclosure.

In one example, as illustrated in FIG. 7, the chip 700 may also include a memory 720. The processor 710 may call a computer program from the memory 720 and run the computer program to implement the method in the embodiments of the present disclosure.

The memory 720 may be a separate device from the processor 710, or may be integrated in the processor 710.

In one example, the chip 700 may also include an input interface 730. The processor 710 may control the input interface 730 to communicate with another device or chip, and specifically, may acquire information or data transmitted by another device or chip.

In one example, the chip 700 may also include an output interface 740. The processor 710 may control the output interface 740 to communicate with another device or chip, and specifically, may output information or data to another device or chip.

In one example, the chip may be applied to the network device in the embodiments of the present disclosure. The chip may implement a corresponding process implemented by the network device in each method of the embodiments of the disclosure, which will not be elaborated herein for brief description.

In one example, the chip may be applied to the terminal device in the embodiments of the present disclosure. The chip may implement a corresponding process implemented by the terminal device in each method of the embodiments of the disclosure, which will not be elaborated herein for brief description.

It is to be understood that in the embodiments of the disclosure, the chip may also be referred to as a system level chip, a system chip, a chip system or a system-on-chip.

FIG. 8 is a schematic block diagram of a communication system 800 provided by the embodiments of the present disclosure. As illustrated in FIG. 8, the communication system 800 includes a terminal device 810 and a network device 820.

The terminal device 810 may implement the corresponding functions implemented by the terminal device in the above methods, and the network device 820 may implement the corresponding functions implemented by the network device in the above methods. Details will not be elaborated herein for brief description.

It is to be understood that in the embodiments of the disclosure, the processor may be an integrated circuit chip with a signal processing capability. In an implementation process, each operation of the method embodiments may be completed by an integrated logical circuit of hardware in the processor or an instruction in a software form. The processor may be a universal processor, a Digital Signal Processor (DSP), an Application Specific Integrated Circuit (ASIC), a Field Programmable Gate Array (FPGA) or another programmable logical device, discrete gate or transistor logical device and discrete hardware component. Each method, step and logical block diagram disclosed in the embodiments of the disclosure may be implemented or executed. The universal processor may be a microprocessor or the processor may also be any related processor and the like. The operations of the methods disclosed in combination with the embodiments of the disclosure may be directly embodied to be executed and completed by a hardware decoding processor, or executed and completed by a combination of hardware and software modules in the decoding processor. The software module may be located in a mature storage medium in the art, such as a Random Access Memory (RAM), a flash memory, a Read-Only Memory (ROM), a Programmable ROM (PROM), an Electrically Erasable PROM (EEPROM) or a register. The storage medium is located in the memory. The processor reads information in the memory, and completes the operations of the above methods in combination with hardware of the processor.

It may be understood that the memory in the embodiment of the disclosure may be a volatile memory or a non-volatile memory, or may include the volatile memory and the non-volatile memory. The non-volatile memory may be an ROM, a PROM, an Erasable PROM (EPROM), an EEPROM or a flash memory. The volatile memory may be an RAM and is used as an external high-speed cache. It is exemplarily but unlimitedly described that RAMs in various forms may be adopted, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM) and a Direct Rambus RAM (DR RAM). It is to be noted that the memory of the system and the method described in the disclosure is intended to include but not limited to memories of these and any other suitable type.

It is to be understood that the above memory is exemplarily but unlimitedly described. For example, the memory in the embodiments of the disclosure may also be an SRAM, a DRAM, an SDRAM, a DDR SDRAM, an ESDRAM, an SLDRAM and a DR RAM. That is, the memory in the embodiments of the disclosure is intended to include but not limited to memories of these and any other suitable type.

The embodiments of the disclosure also provide a computer-readable storage medium for storing one or more computer programs.

In one embodiment, the computer-readable storage medium may be applied in the network device of the embodiments of the disclosure. The computer programs may enable a computer to perform the corresponding process implemented by the network device in each method of the embodiments of the disclosure, which will not be elaborated herein for brief description.

In one example, the computer-readable storage medium may be applied in the terminal device of the embodiments of the disclosure. The computer programs may enable a computer to perform the corresponding process implemented by the mobile terminal/terminal device in each method of the embodiments of the disclosure, which will not be elaborated herein for brief description.

The embodiments of the disclosure also provide a computer program product. The computer program product includes one or more computer program instructions.

In one embodiment, the computer program product may be applied in the network device of the embodiments of the disclosure. The computer program instructions may enable a computer to perform the corresponding process implemented by the network device in each method of the embodiments of the disclosure, which will not be elaborated herein for brief description.

In one example, the computer program product may be applied in the mobile terminal/terminal device of the embodiments of the disclosure. The computer program instructions may enable a computer to perform the corresponding process implemented by the mobile terminal/terminal device in each method of the embodiments of the disclosure, which will not be elaborated herein for brief description.

The embodiments of the disclosure also provide a computer program.

In one embodiment, the computer program may be applied in the network device of the embodiments of the disclosure. The computer program, when executed by a computer, enables the computer to perform the corresponding process implemented by the network device in each method of the embodiments of the disclosure, which will not be elaborated herein for brief description.

In one example, the computer program may be applied in the mobile terminal/terminal device of the embodiments of the disclosure. The computer program, when executed by a computer, enables the computer to perform the corresponding process implemented by the mobile terminal/terminal device in each method of the embodiments of the disclosure, which will not be elaborated herein for brief description.

Those of ordinary skill in the art may realize that the units and algorithm operations of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. Professionals may realize the described functions for each specific application by use of different methods, but such realization shall fall within the scope of the disclosure.

Those skilled in the art may clearly learn about that specific working processes of the system, device and unit described above may refer to the corresponding processes in the method embodiment and will not be elaborated herein for convenient and brief description.

In some embodiments provided by the disclosure, it is to be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each functional unit in each embodiment of the disclosure may be integrated into a processing unit, each unit may also physically exist independently, and two or more than two units may also be integrated into a unit.

When being realized in form of software functional unit and sold or used as an independent product, the function may also be stored in a computer-readable storage medium. Based on such an understanding, the technical solutions of the disclosure substantially or parts making contributions to the conventional art or part of the technical solutions may be embodied in form of software product, and the computer software product is stored in a storage medium, including a plurality of instructions configured to enable a computer device (which may be a personal computer, a server, a network device or the like) to execute all or part of the operations of the method in each embodiment of the disclosure. The abovementioned storage medium includes: various media capable of storing program codes such as a U disk, a mobile hard disk, a ROM, a RAM, a magnetic disk or an optical disk.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A method for data transmission, applied to a terminal device, the method comprising:
   determining a transmission parameter of a data channel based on data channel configuration information corresponding to a control resource set (CORESET) or a search space; and
   transmitting or receiving the data channel based on the transmission parameter;
   wherein the method further comprises:
   acquiring a correspondence between identification information of the CORESET or the search space and identification information of the data channel configuration information through a higher layer signaling from the network side;
   wherein the CORESET or the search space is a CORESET or a search space where downlink control information (DCI) for scheduling the data channel is detected; or, the CORESET or the search space is a CORESET or a search space using same quasi-co-location (QCL) type D assumption as a control channel for scheduling the data channel.

2. The method of claim 1, further comprising:
determining the data channel configuration information according to the correspondence.

3. The method of claim 1, wherein the transmission parameter comprises at least one of:
a transmission scheme used by the data channel, a power control parameter, frequency-domain frequency hopping configuration, configuration of whether to perform discrete fourier transform (DFT) transformation, codebook subset constraint configuration, configuration of a maximum transmission layer number, transmission configuration of uplink control information (UCI) carried by the data channel, configuration of whether to allow pi/2-binary phase shift keying (BPSK) modulation of the DFT transformation, a scrambling ID used for scrambling of the data channel, demodulation reference signal (DMRS) configuration of the data channel, candidate transmission configuration indicator (TCI) states of the data channel, an interleaved resource unit from a virtual resource block (VRB) to a physical resource block (PRB), time-domain resource configuration of the data channel, a number of repetition times or a number of aggregated time slots of the data channel, rate matching resource configuration, size of a resource block group (RBG) used by resource allocation, a modulation coding scheme (MCS) table used by data transmission, zero-power channel state information-reference signal (CSI-RS) configuration or PRB bundling configuration.

4. The method of claim 1, wherein determining the transmission parameter of the data channel based on the data channel configuration information corresponding to the CORESET or the search space comprises:
detecting a DCI in at least one CORESET or search space;
determining, based on the CORESET or the search space where the DCI is detected, the data channel configuration information corresponding to the CORESET or the search space; and
determining the transmission parameter of the data channel scheduled by the DCI based on the data channel configuration information.

5. The method of claim 1, wherein transmitting or receiving the data channel based on the transmission parameter comprises at least one of:
transmitting or receiving the data channel based on a transmission scheme used by the data channel;
determining uplink transmit power based on a power control parameter, and transmitting the data channel based on the uplink transmit power;
determining, based on frequency-domain frequency hopping configuration, whether to perform frequency-domain frequency hopping and a manner for determining a frequency-domain resource when the frequency-domain frequency hopping is performed, and determining the frequency-domain resource used for transmitting or receiving the data channel based on whether to perform frequency hopping and the manner for determining the frequency-domain resource when the frequency-domain frequency hopping is performed; or,
determining whether to perform DFT transformation on data based on configuration of whether to perform DFT transformation, and transmitting the data channel subjected to the DFT transformation or non-DFT transformation based on a result of whether to perform the DFT transformation.

6. The method of claim 1, wherein transmitting or receiving the data channel based on the transmission parameter comprises at least one of:
determining a codebook subset available for precoding based on codebook subset constraint configuration, determining a precoding matrix used for transmitting the data channel based on the codebook subset and precoding indication information from a network side, and transmitting the data channel based on the determined precoding matrix;
determining a maximum transmission layer number allowed for present data transmission based on configuration of a maximum transmission layer number, determining content of scheduling request indicator/rank indicator (SRI/RI) indication field in the DCI based on the maximum transmission layer number, and transmitting the data channel based on the content of the SRI/RI indication field;
determining, based on transmission configuration of UCI carried by the data channel, a physical resource occupied by the UCI, and transmitting the UCI in the physical resource on the data channel; or,
determining, based on configuration of whether to allow pi/2-BPSK modulation of DFT transformation, whether to perform the DFT transformation on the data channel modulated by the pi/2-BPSK modulation and transmitting the data channel.

7. The method of claim 1, wherein transmitting or receiving the data channel based on the transmission parameter comprises at least one of:
performing scrambling on the data channel based on a scrambling ID used for scrambling of the data channel, and transmitting the scrambled data channel;
determining a physical resource and/or sequence of a DMRS based on DMRS configuration of the data channel, and transmitting or receiving the DMRS on the data channel;
determining QCL assumption for detection of the data channel based on candidate TCI states of the data channel and TCI state indication information in the DCI, and receiving the data channel based on the QCL assumption; or,
performing, based on an interleaved resource unit from a VRB to a PRB, interleaving from the VRB to the PRB, and performing physical resource mapping of the data channel.

8. The method of claim 1, wherein transmitting or receiving the data channel based on the transmission parameter comprises at least one of:
determining a time-domain resource occupied by the data channel in one time slot based on time-domain resource configuration of the data channel, and transmitting or receiving the data channel on the time-domain resource;
determining a number of time slots successively occupied by the data channel based on a number of repetition times or a number of aggregated time slots of the data channel, and transmitting or receiving the data channel in a time slot corresponding to the number of time slots;
performing rate matching of data carried by the data channel based on rate matching resource configuration, and transmitting or receiving matched data on the data channel; or,
determining a frequency-domain resource indicated by a DCI based on size of a RBG used by resource allocation, and transmitting or receiving the data channel on the frequency domain resource.

9. The method of claim 1, wherein transmitting or receiving the data channel based on the transmission parameter comprises at least one of:
determining a modulation coding scheme used by the data channel based on an MCS table and MCS information indicated by the DCI, and transmitting or receiving the data channel based on the modulation coding scheme;
performing downlink channel estimation based on the DMRS according to PRB bundling configuration, and performing demodulation on the received data channel based on a result of the downlink channel estimation; or
determining a physical resource occupied by a zero-power CSI-RS resource based on zero-power CSI-RS configuration, and performing no transmission or reception of the data channel on the physical resource.

10. A terminal device, comprising:
a first processor, configured to determine a transmission parameter of a data channel based on data channel configuration information corresponding to a control resource set (CORESET) or a search space; and
a first transceiver, configured to transmit or receive the data channel based on the transmission parameter;
wherein the first transceiver is configured to acquire a correspondence between identification information of the CORESET or the search space and identification information of the data channel configuration information through a higher layer signaling from the network side;
wherein the CORESET or the search space is a CORESET or a search space where downlink control information (DCI) for scheduling the data channel is detected; or, the CORESET or the search space is a CORESET or a search space using same quasi-co-location (QCL) type D assumption as a control channel for scheduling the data channel.

11. The terminal device of claim 10, wherein the first processor is configured to determine the data channel configuration information according to the correspondence.

12. The terminal device of claim 10, wherein the transmission parameter comprises at least one of:
a transmission scheme used by the data channel, a power control parameter, frequency-domain frequency hopping configuration, configuration of whether to perform discrete fourier transform (DFT) transformation, codebook subset constraint configuration, configuration of a maximum transmission layer number, transmission configuration of uplink control information (UCI) carried by the data channel, configuration of whether to allow pi/2-binary phase shift keying (BPSK) modulation of the DFT transformation, a scrambling ID used for scrambling of data carried by the data channel, demodulation reference signal (DMRS) configuration of the data channel, candidate transmission configuration indicator (TCI) states of the data channel, an interleaved resource unit from a virtual resource block (VRB) to a physical resource block (PRB), time-domain resource configuration of the data channel, a number of repetition times or a number of aggregated time slots of the data channel, rate matching resource configuration, size of a resource block group (RBG) used by resource allocation, a modulation coding scheme (MCS) table used by data transmission, zero-power channel state information-reference signal (CSI-RS) configuration or PRB bundling configuration.

13. The terminal device of claim 10, wherein
the first processor is configured to detect a DCI in at least one CORESET or search space, determine, based on the CORESET or the search space where the detected DCI is detected, the data channel configuration information corresponding to the CORESET or the search space, and determine the transmission parameter of the data channel scheduled by the DCI based on the data channel configuration information.

14. The terminal device of claim 10, wherein the first transceiver is configured to perform at least one of:
transmitting or receiving the data channel based on a transmission scheme used by the data channel;
determining uplink transmit power based on a power control parameter, and transmitting the data channel based on the uplink transmit power;
determining, based on frequency-domain frequency hopping configuration, whether to perform frequency-domain frequency hopping and a manner for determining a frequency-domain resource when the frequency-domain frequency hopping is performed, and determining the frequency-domain resource used for transmitting or receiving the data channel based on whether to perform frequency hopping and the manner for determining the frequency-domain resource when the frequency hopping is performed; or,
determining whether to perform DFT transformation on data based on configuration of whether to perform DFT transformation, and transmitting the data channel subjected to the DFT transformation or non-DFT transformation based on a result of whether to perform the DFT transformation.

15. The terminal device of claim 10, wherein the first transceiver is configured to perform at least one of:
determining a codebook subset available for precoding based on codebook subset constraint configuration, determining a precoding matrix used for transmitting the data channel based on the codebook subset and precoding indication information from a network side, and transmitting the data channel based on the determined precoding matrix;
determining a maximum transmission layer number allowed for present data transmission based on configuration of a maximum transmission layer number, determining content of scheduling request indicator/rank indicator (SRI/RI) indication field in the DCI based on the maximum transmission layer number, and transmitting the data channel based on the content of the SRI/RI indication field;
determining, based on transmission configuration of UCI carried by the data channel, a physical resource occupied by the UCI, and transmitting the UCI in the physical resource on the data channel; or,
determining, based on configuration of whether to allow pi/2-BPSK modulation of DFT transformation, whether to perform the DFT transformation on the data channel modulated by the pi/2-BPSK modulation and transmitting the data channel.

16. The terminal device of claim 10, wherein the first transceiver is configured to perform at least one of:
performing scrambling on the data channel based on a scrambling ID used for scrambling of the data channel, and transmitting the scrambled data channel;
determining a physical resource and/or sequence of a DMRS based on DMRS configuration of the data channel, and transmitting or receiving the DMRS on the data channel;
determining QCL assumption used for detection of the data channel based on candidate TCI states of the data channel and TCI state indication information in the DCI, and receiving the data channel based on the QCL assumption; or, performing, based on an interleaved resource unit from a VRB to a PRB, interleaving from the VRB to the PRB, and performing physical resource mapping of the data channel.

17. The terminal device of claim 10, wherein the first transceiver is configured to perform at least one of:

determining a time-domain resource occupied by the data channel in one time slot based on time-domain resource configuration of the data channel, and transmitting or receiving the data channel on the time-domain resource;

determining a number of time slots successively occupied by the data channel based on a number of repetition times or a number of aggregated time slots of the data channel, and transmitting or receiving the data channel in a time slot corresponding to the number of time slots;

performing rate matching of data carried by the data channel based on rate matching resource configuration, and transmitting or receiving matched data on the data channel; or, determining a frequency-domain resource indicated by a DCI based on size of a RBG used by resource allocation, and transmitting or receiving the data channel on the frequency-domain resource.

18. The terminal device of claim 10, wherein the first transceiver is configured to perform at least one of:

determining a modulation coding scheme used by the data channel based on an MCS table and MCS information indicated by the DCI, and transmitting or receiving the data channel based on the modulation coding scheme;

performing downlink channel estimation based on the DMRS according to PRB bundling configuration, and performing demodulation on the received data channel based on a result of the downlink channel estimation; or determining a physical resource occupied by a zero-power CSI-RS resource based on zero-power CSI-RS configuration, and performing no transmission or reception of the data channel on the physical resource.

19. A non-transitory computer readable storage medium, storing a computer program that causes a computer to execute a method for data transmission, the method comprising:

determining a transmission parameter of a data channel based on data channel configuration information corresponding to a control resource set (CORESET) or a search space; and transmitting or receiving the data channel based on the transmission parameter;

wherein the method further comprises:

acquiring a correspondence between identification information of the CORESET or the search space and identification information of the data channel configuration information through a higher layer signaling from the network side;

wherein the CORESET or the search space is a CORESET or a search space where downlink control information (DCI) for scheduling the data channel is detected; or, the CORESET or the search space is a CORESET or a search space using same quasi-co-location (QCL) type D assumption as a control channel for scheduling the data channel.

20. The non-transitory computer readable storage medium of claim 19, wherein the method further comprises:

determining the data channel configuration information according to the correspondence.

* * * * *